(12) United States Patent
Geddes et al.

(10) Patent No.: US 8,876,307 B2
(45) Date of Patent: Nov. 4, 2014

(54) WEBCAM ILLUMINATION FRAME

(76) Inventors: Henry Geddes, Delray Beach, FL (US);
Ian Shiell, Delray Beach, FL (US)

( * ) Notice: Subject to any disclaimer, the term of this patent is extended or adjusted under 35 U.S.C. 154(b) by 133 days.

(21) Appl. No.: 13/361,605

(22) Filed: Jan. 30, 2012

(65) Prior Publication Data
US 2013/0194775 A1 Aug. 1, 2013

(51) Int. Cl.
*G03B 15/02* (2006.01)
(52) U.S. Cl.
USPC .......... 362/11; 362/217.11; 362/371; 362/219
(58) Field of Classification Search
USPC ................. 362/217.11, 371, 219, 11
See application file for complete search history.

(56) References Cited

U.S. PATENT DOCUMENTS

| | | | |
|---|---|---|---|
| 3,098,611 A * | 7/1963 | Connell ........................... | 40/714 |
| 3,604,913 A | 9/1971 | Crete | |
| 4,449,024 A | 5/1984 | Stracener | |
| 4,626,965 A | 12/1986 | Gupta et al. | |
| 4,760,277 A | 7/1988 | Vurpillat | |
| 4,942,685 A * | 7/1990 | Lin ................................ | 40/715 |
| 5,097,396 A | 3/1992 | Myers | |
| 5,397,867 A | 3/1995 | Demeo | |
| 5,461,400 A | 10/1995 | Ishii et al. | |
| 5,793,358 A | 8/1998 | Petkovic et al. | |
| 5,815,225 A | 9/1998 | Nelson | |
| 5,844,773 A | 12/1998 | Malhi | |
| 5,961,198 A | 10/1999 | Hira et al. | |
| 6,040,811 A | 3/2000 | Malhi | |
| 6,046,730 A | 4/2000 | Bowen et al. | |
| 6,179,432 B1 | 1/2001 | Zhang et al. | |
| 6,448,955 B1 | 9/2002 | Evanicky et al. | |
| 6,474,823 B1 | 11/2002 | Agata et al. | |
| 6,776,497 B1 | 8/2004 | Huppi et al. | |
| 6,940,569 B2 | 9/2005 | Tanaka et al. | |
| 7,048,401 B2 | 5/2006 | Lee et al. | |
| 7,196,693 B2 | 3/2007 | Chien et al. | |
| 7,293,890 B2 | 11/2007 | Chang | |
| 7,436,657 B2 | 10/2008 | Motai et al. | |
| 7,695,149 B2 | 4/2010 | Yukawa et al. | |
| 7,708,416 B2 | 5/2010 | Yurochko | |
| 7,717,607 B2 | 5/2010 | Harris et al. | |
| 7,741,570 B2 | 6/2010 | Yurochko et al. | |
| 7,742,014 B2 | 6/2010 | Kimura | |
| 7,841,729 B2 | 11/2010 | Geddes | |
| 7,914,176 B2 * | 3/2011 | Stanley et al. ................ | 362/285 |
| 7,959,311 B2 | 6/2011 | Li et al. | |
| 8,022,846 B2 | 9/2011 | Yurochko | |
| 8,031,463 B2 | 10/2011 | Yukawa et al. | |
| 8,428,644 B1 * | 4/2013 | Harooni ..................... | 455/550.1 |
| 2006/0007666 A1 | 1/2006 | Cook | |
| 2007/0121343 A1 | 5/2007 | Brown | |
| 2007/0139515 A1 | 6/2007 | Du Breuil | |
| 2008/0186699 A1 * | 8/2008 | Saez et al. .................... | 362/191 |
| 2011/0116223 A1 * | 5/2011 | Lev et al. ................. | 361/679.27 |
| 2013/0048809 A1 * | 2/2013 | Jacobson ................... | 248/206.2 |

* cited by examiner

*Primary Examiner* — Evan Dzierzynski
(74) *Attorney, Agent, or Firm* — Allen F Bennett

(57) ABSTRACT

An illumination frame attaches to a laptop computer, computer notebook, table or other communications device having a camera. The frame has a series of light arrays that illuminate an object placed before the camera so that it is more easily and clearly viewed. The arrays provide lighting from many different angles. The lights include diffuse lenses to soften the light applied of an object being viewed.

6 Claims, 3 Drawing Sheets

WEBCAM ILLUMINATION FRAME

CROSS-REFERENCE TO RELATED APPLICATIONS

Not Applicable

STATEMENT REGARDING FEDERALLY SPONSORED

Not Applicable

RESEARCH OR DEVELOPMENT

Not Applicable

REFERENCE TO SEQUENCE LISTING, A TABLE, OR A COMPUTER

Not Applicable

PROGRAM LISTING COMPACT DISC APPENDIX

Not Applicable

BACKGROUND OF THE INVENTION

1. Field of the Invention

This invention relates to a device for illuminating objects being viewed by a camera. More particularly, this invention relates to an illumination frame for a webcam that illuminates a person or object viewed using a communications device such as a webcam.

2. Description of Related Art

Video conference calls are a common method for people to communicate when the parties are remote and wish to be simultaneously viewed. Online viewing via the internet has grown increasingly popular for social purposes as well. This images and video are commonly acquired through a small video camera on a communications device. Communications devices include desktop computers, laptops, tablets, smartphones, cellular phones, flat screens, televisions and other devices that includes a still or video camera for capturing images to be shared.

It is desirable to appear as attractive and appealing as possible in the images obtained via communications devices. For example, in online chatting or dating sites, a user desires to appear as attractive as possible. However, because these cameras and communications devices are usually not located in a photography studio or other ideal environment, images are not always their clearest and most appealing.

Poor lighting is one of the primary reasons for the poor appearance of images that are viewed from webcams on communications devices. The image is not as accurate and the individual does not appear as attractive as they otherwise would in person. Proper lighting ensures an aesthetically pleasing appearance of an individual's face.

Those skilled in the art of the motion picture and/or photography industries will appreciate that lighting of an object or person being viewed may be difficult and have developed complex methods of illuminating their subject matter. However, such elaborate lighting fixtures are impractical for use with a webcam on a communications device. Using a simple bright light may be uncomfortable for the person being viewed.

Accordingly, there is a need to provide proper lighting for users that are viewed through a webcam to ensure that they appear aesthetically pleasing. It is therefore desirable to provide a system and method for applying light to an object or person being viewed that effectively improves its appearance without be uncomfortable.

SUMMARY OF THE INVENTION

The present invention provides an illumination frame comprising an elongate base having a plurality of lights, a first end, and a second end, a first arm having a plurality of lights and a tension clip, the first arm being pivotally attached to the first end of the base and a second arm having a plurality of lights and a tension clip, the second arm being pivotally attached to the second end of the base.

The present invention further provides an illumination frame wherein the lights include a diffusing lens.

The present invention further provides a method of illuminating an object being observed through a camera proximal to a monitor comprising arranging about the monitor a frame comprising a base, a first arm and a second arm, wherein each of the base, first arm and second arm have a linear light array.

Accordingly, an object of the present invention is to provide a system and means for illuminating an object or person being viewed by a camera, and specifically a webcam. It is another object of the present invention to provide a system and means to improve the aesthetic quality of a person or object being viewed by a webcam.

It is a further object of the present invention to provide a system and means of illuminating a person in front of a webcam without causing discomfort.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

DETAILED DESCRIPTION

Figure 1:
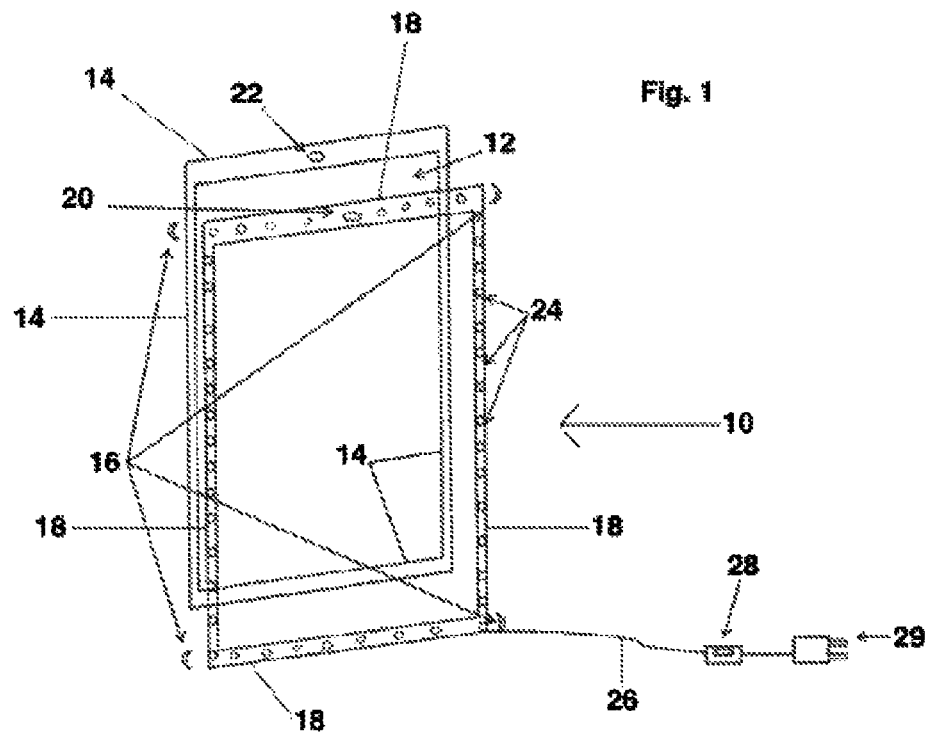
FIG. 1 is a perspective view of an embodiment of the illumination frame and a tablet.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

FIG. 1. shows an illumination frame 10 for use with, e.g., a tablet internet device 12. The frame 10 may be comprise of four rectilinear light arrays 18. The frame 10 may be substantially rectangular and made of a material, such as for example metal, plastic or a lightweight composite, that may be optionally rigid, semi-rigid or flexible. The frame 10 may be removably attachable to the outside edges 14 of the tablet 12. The frame 10 may include one or more clips 16 for removable attachment to the outside edges 14 of the tablet 12. Optionally, clips 16 may be tension clips, clamps or similar devices that may allow removable attachment to the tablet. Optionally, the frame may be attachable to the tablet by adhesives.

One of the light arrays 18 may include an aperture 20 aligned with the position of a webcam 22 on the tablet 12. In this embodiment, each of the light arrays 18 has a substantially linear arrangement of individual lights 24. The individual lights 24 of the light arrays 18 may be LED lights, incandescent bulbs or other devices for emanating light. Optionally, the lights may be configured in a nonlinear pattern along the arrays 18, such as for example a zig-zag pattern or in a series of light clusters. Optionally, each of the arrays 18 may be a single elongate light source rather than a series of individual lights. Preferably the light arrays 18 provide illumination to an object in front of the webcam 22 from a plurality of angles, thereby minimizing shadows on the object viewed and otherwise enhancing the view of the webcam 22.

The lights 24 optionally include one or more diffusing lenses to soften the light they emit. By using a plurality of relatively soft lights 24, a person or animal being viewed by the webcam 22 may not experience the discomfort associated with exposure to high intensity light.

The frame may be include batteries to supply power to the lights. Optionally, the frame may include a power cord 26. The power cord 26 may be adapted to connect to an A.C. power source such as a wall socket or may optionally connect to a USB port of the tablet. This embodiment includes a plug 29 for connection to a standard wall socket.

The lights of the frame 10 may be controlled by a simple on/off switch 28 on the power cord 26 or on the frame 10. Alternatively, the intensity of the light emitted by the arrays 18 may be attenuated by an adjustable switch. If the frame is powered by a cord connected to a USB port of the tablet, the intensity of emitted light may be adjusted by software that attenuates the power supplied to the lights. Software may also optionally actuate the light arrays semi-automatically, for example only actuating the lights when the webcam is in use. It may be desirable to provide software or other light controlling means to allow the lights to alter the color of the emitted light, or to blink in various patterns.

FIG. 1 shows the illumination device used with a webcam on a tablet type internet device. However, the device may be used with any communications device, loosely defined as any device used to capture video or still images that may or may not include instantaneous access to the internet or other communication medium and may include, but is not limited to, desktop computers, laptop computer, tablets, smartphones, cell phones, televisions, flat screen televisions, monitors and other devices that may incorporate a video or still image capturing camera.

Figure 2:
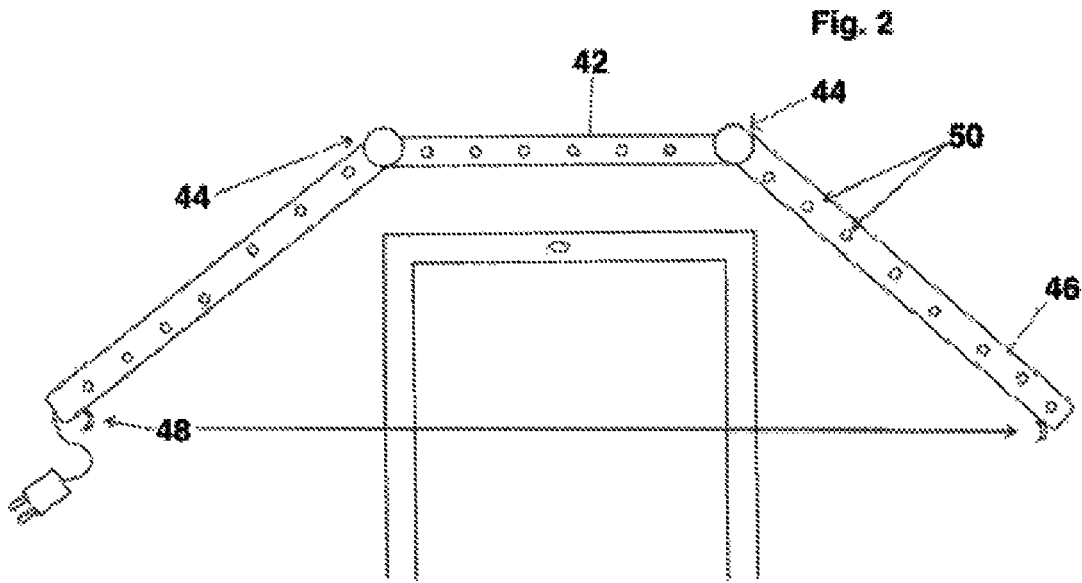
FIG. 2 is a front view of another embodiment of the illumination frame.

FIG. 2 shows an illumination frame 40 having three adjustable arrays. The primary array 42 has two distal pivot points 44. Side arrays 46 are attached to the primary array 42 at the pivot 44 points and may be adjustably pivoted in relation to the primary array 42.

The illumination frame 40, as with the illumination frame 10 of FIG. 1, may be made of various and sundry materials, such as for example metal, plastic or a lightweight composite, that may be optionally rigid, semi-rigid or flexible. The side arrays 46 may include one or more clips 48 which may be tension clips, clamps or similar devices that may allow removable attachment to a tablet, computer monitor or other device having a camera. Optionally, the frame 40 may be attachable by adhesives. The lights 50 of frame 40 may include diffusing lenses and the arrays may be arranged linearly or in different patterns. In this embodiment, the lights 50 are arranged in an incongruent manner along the primary array 42 and each of arrays 46. The lights 50 of the frame 40 may be controlled by a simple switch or by software, as explained supra.

Figure 3:
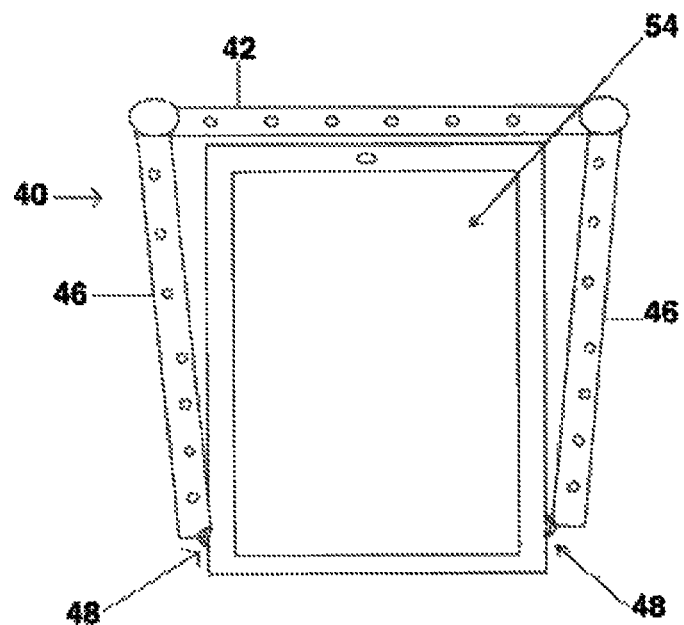
FIG. 3 is a front view of the illumination frame of FIG. 2 attached to a tablet.

FIG. 3. shows the illumination frame 40 of FIG. 2 attached to a tablet internet device 54. Because the side arrays 46 are adjustably pivotable in relation to the primary array 42, the frame 40 may be adjusted to accommodate and attach to tablets of varying size. In FIG. 3 the width of the tablet 54 is less than the length of the primary array 42. The side arms 46 are pivotably adjusted such that the frame 40 lies flush with three of the four edges of the tablet 54 and clips 48 attach the illumination frame 40 to the tablet 54.

Figure 4:
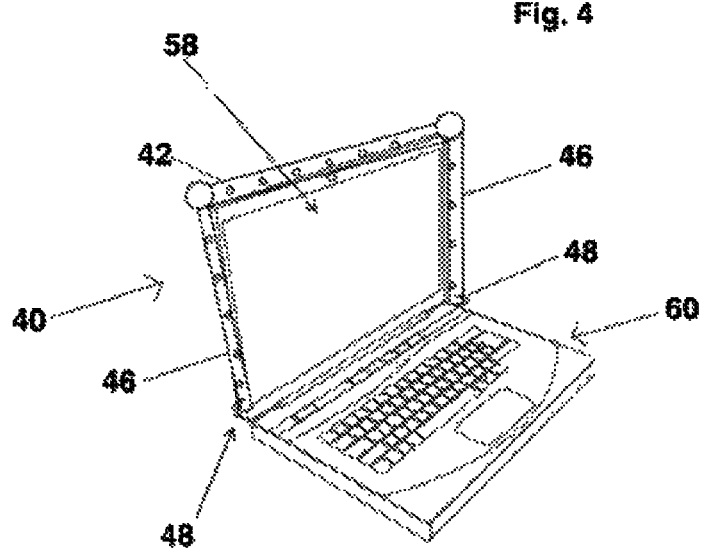
FIG. 4. is a perspective view of the illumination frame of FIGS. 2 and 3 attached to a laptop monitor.

FIG. 4 shows the illumination frame 40 attached to a monitor 58 of a laptop 60. The width of the laptop 60 is different than the width of the tablet 54. The illumination frame 40 may be adjusted to suit either device.

Figure 5:
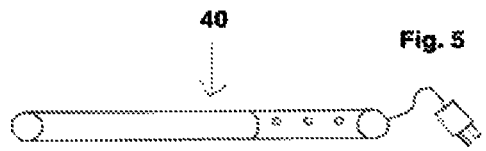
FIG. 5 is a front view of the illumination device of FIGS. 2, 3 and 4 collapsed to a storage configuration.

FIG. 5 shows the illumination frame 40 collapsed for easy storage or transport. The side arrays 46 may be pivoted such that they are parallel to and flush with the primary array 42, forming a compact configuration.

Figure 6:
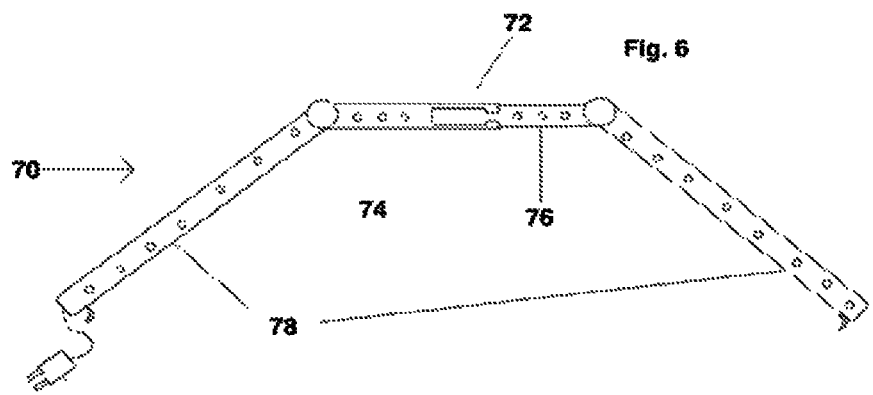
FIG. 6 is a front view of an alternative embodiment of the illumination frame.

FIG. 6 shows an illumination frame 70 having a primary array 72 that may be adjusted to alter its length. The primary frame 72 has two slidably engaged and partially overlapping sections 74 and 76. These sections may be slidably adjusted to alter the length of the primary array. The side arrays 78 may extend from the primary array 72. The side arrays 78 may be pivotably attached to the ends of the primary array 72 to allow adjustment as shown in FIGS. 2-5. Optionally, the side arrays 78 may extend from the primary array 72 perpendicularly without the ability to pivot, as the illumination frame shown in FIG. 1. The illumination frame 70 may optionally include a fourth array extendable between the distal ends of the side arrays. Slidable adjustment of may be facilitated by any of the methods known in the art for sliding two straight objects, such as for example the sliding mechanisms of a slide-rule calculator or a telescope.

Figure 7:
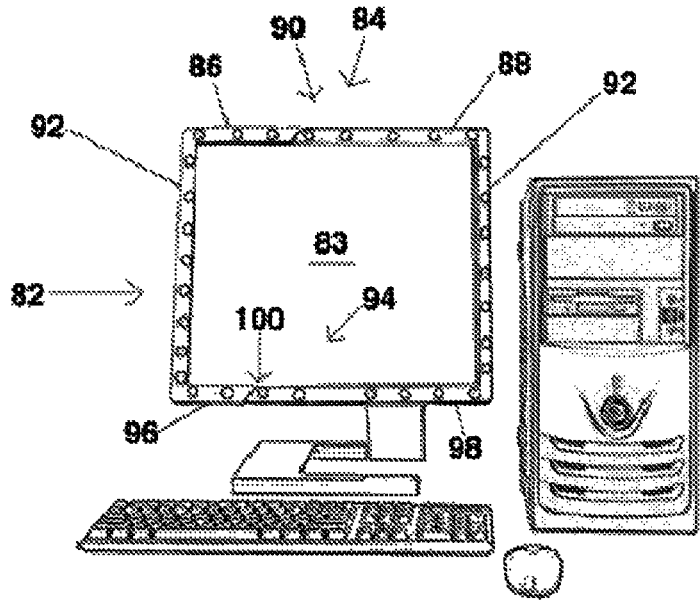
FIG. 7 is a front view of the illumination frame of FIG. 6 attached to a computer monitor.

FIG. 7 shows an illumination frame 82 attached to a computer monitor 83. Illumination frame 82 has a primary array 84 comprised of two slidably adjustable portions 86 and 88 and sliding-engagement point 90. The illumination frame 82 has two side arrays 92 perpendicular to the primary array 84. The illumination frame 82 also includes a lower array 94 comprised of two slidably adjustable portions 96 and 98 that connect at sliding-engagement point 100.

Whereas, the present invention has been described in relation to the drawings attached hereto, it should be understood that other and further modifications, apart from those shown or suggested herein, may be made within the spirit and scope of this invention. Descriptions of the embodiments shown in the drawings should not be construed as limiting or defining the ordinary and plain meanings of the terms of the claims unless such is explicitly indicated.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. An illumination frame comprising:
an elongate base having a light array;
an elongate first arm attached to the base and having a light array and an attachment mechanism;
an elongate second arm attached to the base and having a light array and an attachment mechanism; and,
an aperture;
wherein the first arm and the second arm are pivotally attached to the base and the light arrays comprises a plurality of lights and at least one diffusing lens.

2. A method of illuminating an object being observed through a camera on a communications device comprising:
arranging a frame about the communications device at least one light array, wherein the at least one light array comprises a base light array on a base of a frame, a first light array on a first arm attached to the base of the frame and a second light array on a second arm attached to the base of the frame.

3. The method of illuminating an object being observed through a camera on a communications device of claim 2 wherein the base further comprises an aperture.

4. The method of illuminating an object being observed through a camera on a communications device of claim 2 wherein the first arm and the second arm are rigidly attached to the base of the frame.

5. The method of illuminating an object being observed through a camera on a communications device of claim 4 wherein the base further comprises an aperture.

6. The method of illuminating an object being observed through a camera on a communications device of claim 5 further comprising a lower arm having a light array and extending between a distal end of the first arm and a distal end of the second arm and is substantially parallel to the base.

* * * * *